(No Model.)
J. KAUFMANN.
FAUCET.
No. 279,952.  Patented June 26, 1883.
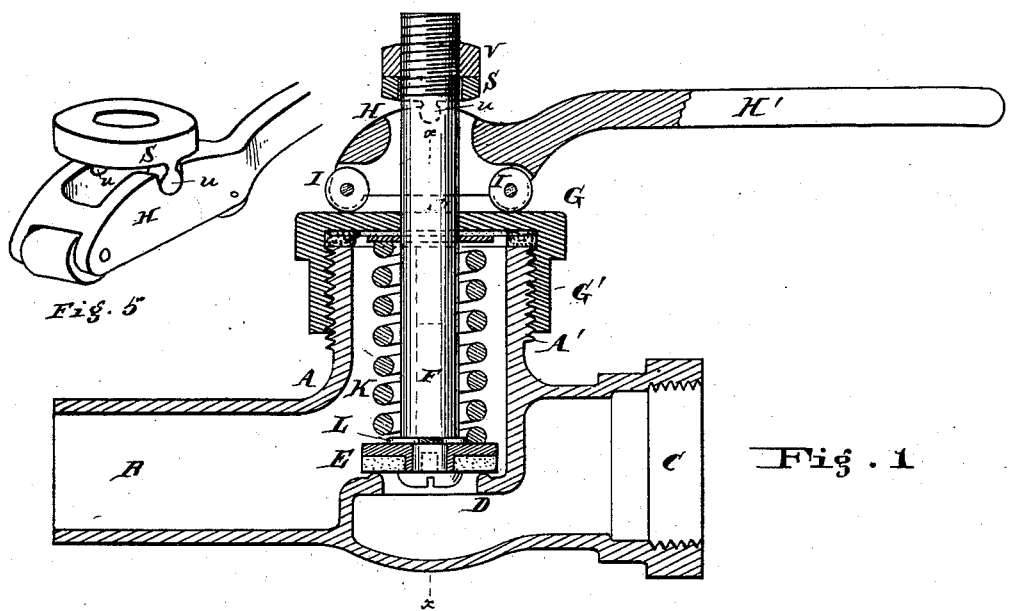
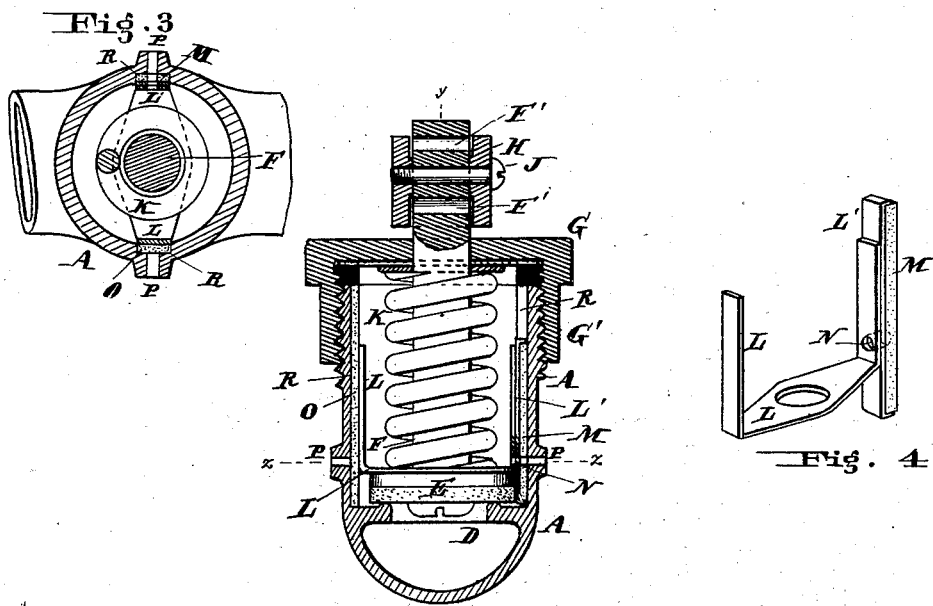
Attests:
R. J. Chubb
Geo. J. Harding
Inventor
Joseph Kaufmann
by Francis T. Chambers
his attorney

UNITED STATES PATENT OFFICE.

JOSEPH KAUFMANN, OF NEW YORK, N. Y.

FAUCET.

SPECIFICATION forming part of Letters Patent No. 279,952, dated June 26, 1883.

Application filed February 5, 1883. (No model.)

*To all whom it may concern:*

Be it known that I, JOSEPH KAUFMANN, of New York city, State of New York, have invented a new and useful Improvement in Faucets adapted to control the flow of liquids, of which the following is as full, complete, and accurate a description as I am able to give, reference being had to the accompanying drawings, which form a part of this specification.

The object of my invention is to provide a faucet having improved automatic appliances for discharging the liquid remaining in the pipe above the faucet after the supply has been cut off, and having, also, mechanism by which the tension with which the valve closes upon its seat may be increased or diminished at will, and, further, in so constructing the faucet that it is adapted to waste from either side, as desired, and in details of construction hereinafter more fully described.

Reference being now had to the drawings, Figure 1 is a sectional elevation of my improved faucet on line $y\ y$. Fig. 2 is a cross-sectional elevation on line $x\ x$. Fig. 3 is a sectional plan view on line $z\ z$. Fig. 4 is a perspective view of the waste-valve, and Fig. 5 another and more detailed view of the top of the valve-rod and its appliances.

A is the body of the faucet. B is the discharge or the eduction end, and C the supply or induction end. D is the valve-seat. E is the valve, and is secured to the valve-rod F, which works through the cap G, provided with the downwardly-projecting threaded flange G', which screws upon the male thread on the vertical part of the body A. $G^2$ is the usual packing. The top of the rod F is threaded, and over it fits an annular collar, S, having projections $t\ t$, which fit into grooves $u\ u$ in the top of the carriage H, and pivot the valve-rod upon said carriage. The collar is held in position by means of the nut V, which screws on the threaded top of the valve-rod, above said collar. The carriage H rests upon the top of the cap G by rollers I, and is provided with an operating-handle, H'. K is the usual spring to keep the valve shut when the upward thrust of the valve-rod has been removed. Secured to the valve or valve-rod, and moving vertically therewith, is the waste-valve body L, having two uprights, one of which, L', clamps and holds a rubber or equivalent packing, M, and has a hole or waste-orifice, N, made through it and the said packing. This packing M slides in a groove, R, in one side of the body A of the faucet, and when the valve E is shut the said waste-orifice N is brought before an aperture, P, through said faucet-body. The other side of the faucet-body is also provided with a similar groove R and aperture P, and this groove is filled up with a packing, O, against which the upright L of the waste-valve slides. The two arms L L' of the waste-valve I make of a single piece of metal, stamped or bent into the form shown in Fig. 4, and secure it to the valve-stem or valve by passing the stem through a hole in the center of its horizontal bottom part in such a manner that it can be turned freely, and its arm L', carrying the packing M, and provided with the hole N, be adjusted to work in either of the grooves R R, the other groove being of course always filled and the orifice P, not in use, closed by the packing O, and the faucet being by this means adapted to waste on either side. By making the arms L L' of the same piece of metal, as described, they act, like a spring, to keep the arm carrying the waste-valve packing thrust against the surface of the groove in which it works. The leg or arm L' of the waste-valve projects some distance below the waste-orifice N, to allow the full upward movement of the main valve E without opening the waste.

By pressing up or down on the handle H' the valve E is raised, compressing the spring K. If there is an increased pressure of water to overcome, the cap G is screwed down, compressing the spring K, and the pivots $t\ t$ in the collar are brought to the proper position by screwing down the nut V. If there is less pressure, the reverse operation takes place. Upon closing the valve E the waste is opened and allows the upper pipe to be drained, and thereby prevents freezing. Instead of the nut V and collar S, the top of the valve-stem may be perforated with holes F' F', as shown in Fig. 2, and pivoted to the carriage H by means of a movable pin, J, which is placed in an upper or lower hole as the cap G is raised or depressed.

Having now described my invention, what I claim as new, and desire to secure by Letters Patent, is—

1. In a self-closing faucet, as shown and described, the faucet-body provided with the adjustable cap G, in combination with the rod F, having pivots adjustable longitudinally upon it, and means supported by said cap to raise said valve-rod by said pivots, substantially as and for the purpose specified.

2. In a self-closing faucet, substantially as shown and described, the combination of the body A, having an adjustable cap, G, with the valve-rod F, having a threaded top, annular ring S, having pivots $t\ t$, nut V, and carriage H, having the lever or arm H', substantially as and for the purpose described.

3. A faucet-body, A, having vertical grooves R and apertures P on both sides, in combination with the valve-rod F, waste-valve L, secured to said rod, and packing O, whereby the faucet can be adjusted to waste on either side, all substantially as and for the purpose described.

4. In a faucet substantially as described, and provided with a waste-orifice, the waste-valve L', adapted to pivot loosely upon the valve-stem and move with it, and provided with an arm, L, adapted to press against the side of the faucet opposite the waste-valve L', thereby tending to keep the valve pressed against the seat, all substantially as and for the purpose described.

5. A faucet-body, A, having vertical grooves R, holes P, and valve-seat D, in combination with waste-valve L', substantially as shown, adjustable cap G, valve-rod F, spring K, valve E, and means to raise said valve-rod, substantially as and for the purpose described.

In testimony of which invention I have hereunto set my hand.

JOS. KAUFMANN.

Witnesses:
JOHN H. SPRAGUE,
R. S. CHILD, Jr.